(12) United States Patent
Hsu

(10) Patent No.: US 9,661,250 B2
(45) Date of Patent: May 23, 2017

(54) IMAGE SENSOR AND OPERATING METHOD THEREOF, MOTION SENSOR INCLUDING THE SAME

(71) Applicant: PIXART IMAGING INC., Hsin-Chu County (TW)

(72) Inventor: En-Feng Hsu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 14/826,620

(22) Filed: Aug. 14, 2015

(65) Prior Publication Data

US 2016/0065866 A1 Mar. 3, 2016

(30) Foreign Application Priority Data

Aug. 28, 2014 (TW) .............................. 103129797 A
Jul. 10, 2015 (TW) .............................. 104122501 A

(51) Int. Cl.
*H04N 5/378* (2011.01)
*H04N 5/14* (2006.01)

(52) U.S. Cl.
CPC ............. *H04N 5/378* (2013.01); *H04N 5/144* (2013.01)

(58) Field of Classification Search
None
See application file for complete search history.

(56) References Cited

U.S. PATENT DOCUMENTS

| | | | | |
|---|---|---|---|---|
| 7,873,271 B2* | 1/2011 | Fujiwara | ................ | G03B 15/03 348/371 |
| 2007/0165960 A1* | 7/2007 | Yamada | ................ | H04N 9/735 382/254 |
| 2010/0097371 A1* | 4/2010 | Willassen | ............... | H04N 5/378 345/214 |
| 2010/0302426 A1* | 12/2010 | Moini | .................... | H04N 5/378 348/308 |
| 2015/0163435 A1* | 6/2015 | Ota | ........................ | H04N 5/378 348/335 |

FOREIGN PATENT DOCUMENTS

CN 201742472 U 2/2011

* cited by examiner

*Primary Examiner* — James Hannett
(74) *Attorney, Agent, or Firm* — Hauptman Ham, LLP

(57) ABSTRACT

There is provided an operating method of an image sensor including: storing a first charge from an optoelectronic element to a pixel buffer circuit within a first exposure period; transferring the first charge from the pixel buffer circuit to a first storage circuit within a second exposure period; storing a second charge from the optoelectronic element to the pixel buffer circuit within the second exposure period after the first charge is transferred; transferring the second charge from the pixel buffer circuit to a second storage circuit; and comparing charges stored in the first storage circuit and in the second storage circuit to output an analog image signal.

17 Claims, 11 Drawing Sheets

IMAGE SENSOR AND OPERATING METHOD THEREOF, MOTION SENSOR INCLUDING THE SAME

RELATED APPLICATIONS

The present application is based on and claims priority to Taiwanese Application Number 103129797, filed Aug. 28, 2014 and Taiwanese Application Number 104122501, filed Jul. 10, 2015, the disclosure of which is hereby incorporated by reference herein in its entirety.

BACKGROUND

1. Field of the Disclosure

This disclosure generally relates to an image sensor and, more particularly, to an image sensor and an operating method thereof utilizing an analog differencing for eliminating noise from ambient light and a motion sensor including the image sensor.

2. Description of the Related Art

A conventional image sensor generally has a plurality of sensing pixels arranged in array, wherein one operating method of the image sensor uses a rolling shutter, for example, to successively activate, with a control signal, each row of the sensing pixels in the image sensor to capture an image. Since each row of the sensing pixels is successively activated instead of simultaneously activated (i.e. start timings for each row of the sensing pixels to be exposed are different), the image captured by using the rolling shutter may cause distortion in capturing an image of a fast moving object.

Another operating method of the image sensor uses a global shutter, for example, simultaneously to activate all sensing pixels in the image sensor with a control signal so that each row of the sensing pixels starts to be exposed at an identical time to capture an image. Therefore, the image sensor using the global shutter may avoid the distortion problem.

However, in order to eliminate ambient light interference or reducing image noise when the image sensor using the global shutter is capturing an image, one solution is to directly perform a subtraction between two digital image frames through image post processing so as to obtain a differential image frame. For example, referring to FIGS. 1A and 1B, FIG. 1A is a timing diagram of a conventional image sensor 91 using the global shutter to capture an image. It is assumed that the image sensor 91 has 4 rows of sensing pixels $R_1$-$R_4$. In a first period $P_1$, a light source is turned on for a predetermined time and the rows of sensing pixels $R_1$-$R_4$ are simultaneously exposed. Then, the light source is turned off and the rows of sensing pixels $R_1$-$R_4$ are successively read to output a first image signal. In a second period $P_2$, the light source is turned off and the rows of sensing pixels $R_1$-$R_4$ are simultaneously exposed for the predetermined time, and the rows of sensing pixels $R_1$-$R_4$ are successively read to output a second image signal.

Then, referring to FIG. 1B, the first image signal outputted from the image sensor 91 is firstly converted into a first digital signal 9a through an analog to digital converter 93 and stored in a digital buffer 95. Then, the second image signal is converted into a second digital signal 9b through the analog to digital converter 93. Finally, the second digital signal 9b is subtracted from the first digital signal 9a to obtain a third digital signal 9c in which ambient light is eliminated. However, in this way, the digital buffer 95 has to be disposed in a system including the image sensor 91 and the image sensor 91 must successively output two image frames (e.g. image frames formed according to the first digital signal 9a and the second digital signal 9b) so that one processed image frame is obtainable (e.g. an image frame formed according to the third digital signal 9c).

SUMMARY

Accordingly, the present disclosure provides an image sensor and an operating method thereof that utilize an analog differencing to eliminate noise from ambient light.

The present disclosure provides an image sensor and an operating method thereof, wherein the noise due to ambient light in each outputted analog image has been already eliminated.

The present disclosure further provides an image sensor and an operating method thereof that may reduce nearly half of the power consumption and have no need to use a digital buffer to store an image frame for a differential operation between two digital image frames.

The present disclosure further provides an image sensor, an operating method thereof and a motion sensor including the same that detect an object motion according to one image frame.

The present disclosure provides an image sensor. The image sensor includes an optoelectronic conversion circuit and an output circuit. The optoelectronic conversion circuit is configured to store a first charge corresponding to a period of a high level signal and store a second charge corresponding to a period of a low level signal. The output circuit includes a first storage circuit and a second storage circuit respectively configured to store the first charge and the second charge transferred from the optoelectronic conversion circuit, and the output circuit is configured to compare the first charge in the first storage circuit with the second charge in the second storage circuit to output an analog image signal, wherein the high level signal and the low level signal are respectively configured to turn on and turn off a light source; and the optoelectronic conversion circuit is configured to, corresponding to the period of the low level signal, transfer the first charge to the first storage circuit, store the second charge and transfer the second charge to the second storage circuit, successively.

The present disclosure further provides an operating method of an image sensor. The image sensor includes an optoelectronic element, a pixel buffer circuit, a first storage circuit, a second storage circuit and a differential unit. The first storage circuit and the second storage circuit are respectively coupled to two input terminals of the differential unit. The optoelectronic element is configured to generate photocurrents corresponding to a high level signal and a low level signal to be stored in the pixel buffer circuit, wherein the high level signal and the low level signal are configured to turn on and turn off a light source. The operating method includes the steps of: storing a first charge from the optoelectronic element to the pixel buffer circuit in a period of the high level signal; transferring the first charge in the pixel buffer circuit to the first storage circuit in a period of the low level signal; storing a second charge from the optoelectronic element to the pixel buffer circuit in the period of the low level signal after the first charge is transferred; transferring the second charge in the pixel buffer circuit to the second storage circuit; and comparing, by the differential unit, charges stored in the first storage circuit and in the second storage circuit to output an analog image signal.

The present disclosure further provides an image sensor. The image sensor includes an optoelectronic conversion circuit, a first storage circuit, a second storage circuit and a differential unit. The optoelectronic conversion circuit is configured to generate a photocurrent associated with a light source and ambient light in a first period and generate a photocurrent associated with the ambient light in a second period. The first storage circuit is configured to store, in the second period, a first charge corresponding to the photocurrent of the first period. The second storage circuit is configured to store a second charge corresponding to the photocurrent of the second period after the first charge is stored. The differential unit includes two input terminals respectively coupled to the first storage circuit and the second storage circuit, and configured to compare the first charge in the first storage circuit with the second charge in the second storage circuit to eliminate noise due to the ambient light.

The present disclosure further provides an image sensor including a plurality of sensing pixels, a plurality of optoelectronic conversion circuits and a plurality of output circuits. The sensing pixels are arranged in array. Each of the optoelectronic conversion circuits is configured to store a first charge corresponding to a first exposure period and store the first charge for a storing period, successively output the first charge and store a second charge corresponding to a second exposure period and output the second charge, wherein the storing period is between the first exposure period and the second exposure period. Each of the output circuits includes a first storage circuit and a second storage circuit respectively configured to store the first charge and the second charge outputted from the optoelectronic conversion circuits and compare the first charge in the first storage circuit with the second charge in the second storage circuit to output an analog image signal, wherein each of the sensing pixels includes one of the optoelectronic conversion circuits and each column of the sensing pixels is coupled to one of the output circuits.

The present disclosure further provides an operating method of an image sensor. The image sensor includes a plurality of optoelectronic elements a plurality of pixel buffer circuits, a plurality of first storage circuits, a plurality of second storage circuits and a plurality of differential units. The first storage circuits and the second storage circuits are respectively coupled to the differential units. The optoelectronic elements are configured to generate photocurrents to the pixel buffer circuits. The operating method includes the steps of: storing a first charge from the optoelectronic element to the pixel buffer circuit within a first exposure period; storing the first charge in the pixel buffer circuit for a storing period; transferring the first charge in the pixel buffer circuit to the first storage circuit within a second exposure period; storing a second charge from the optoelectronic element to the pixel buffer circuit within the second exposure period after the first charge is transferred; transferring the second charge in the pixel buffer circuit to the second storage circuit; and comparing, by the differential unit, the charges stored in the first storage circuit and in the second storage circuit to output an analog image signal.

The present disclosure further provides a motion sensor. The motion sensor includes an image sensor, an analog to digital converter and a processor. The image sensor is configured to output a plurality of analog image signals corresponding to a plurality of sensing pixels. The analog to digital converter is configured to convert the analog image signals to a plurality of digital image signals. The processor is configured to calculate pixel positions of the digital image signals of an image having nonzero brightness to accordingly identify a motion position.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
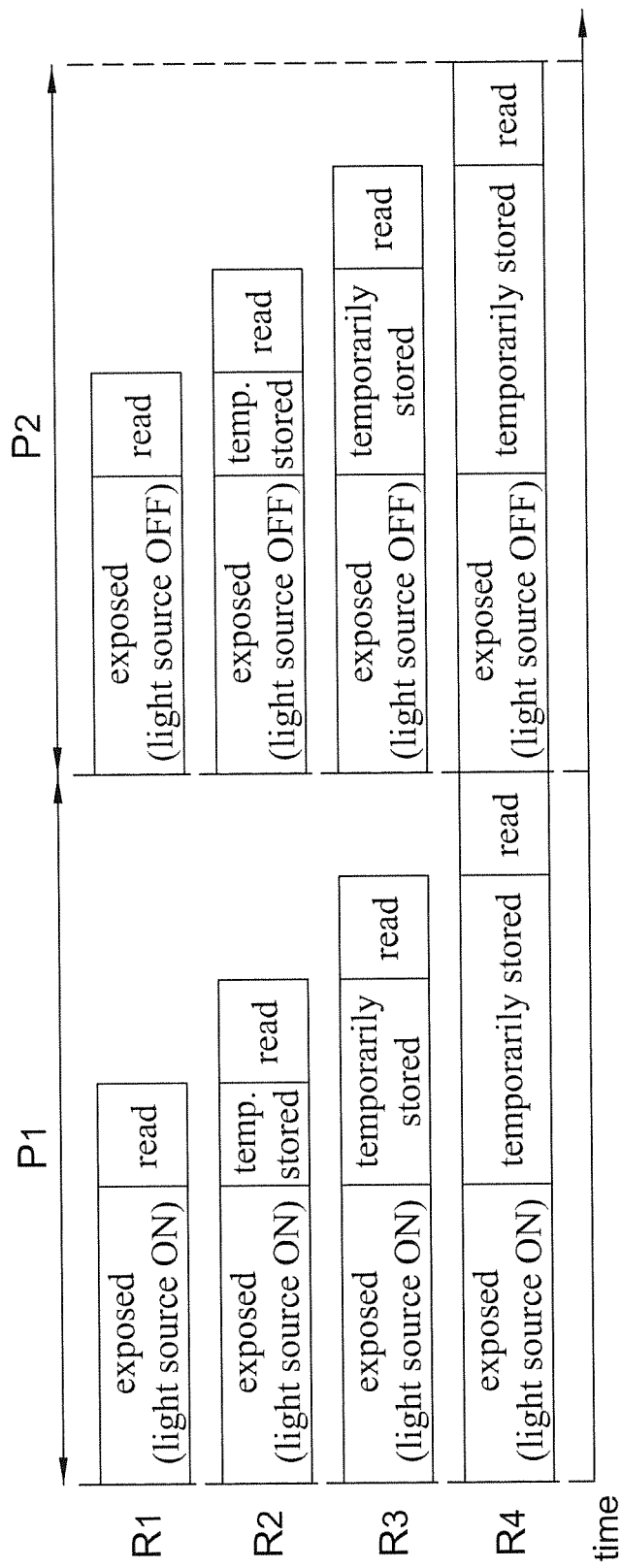
FIG. 1A is a timing diagram of a conventional image sensor using a global shutter to capture an image.
Figure 1B:
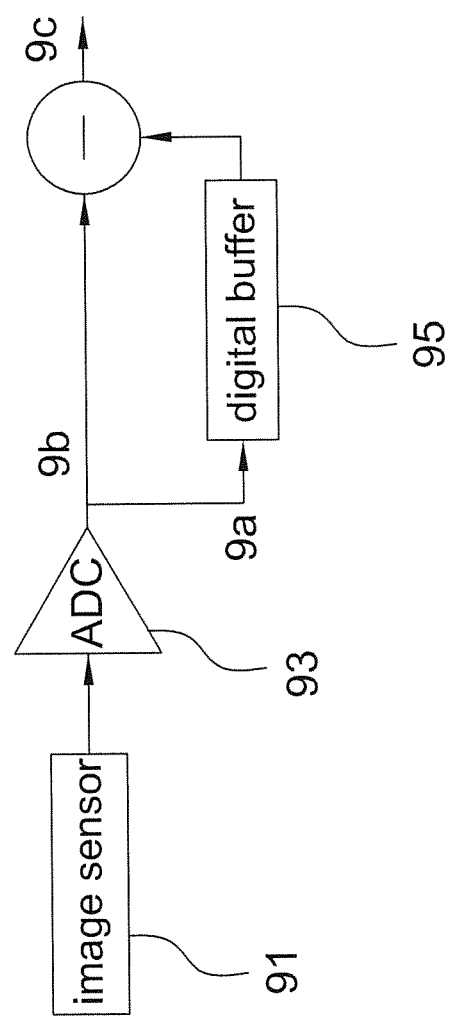
FIG. 1B is a schematic block diagram of performing a conventional differential operation between two digital image frames.
Figure 2:
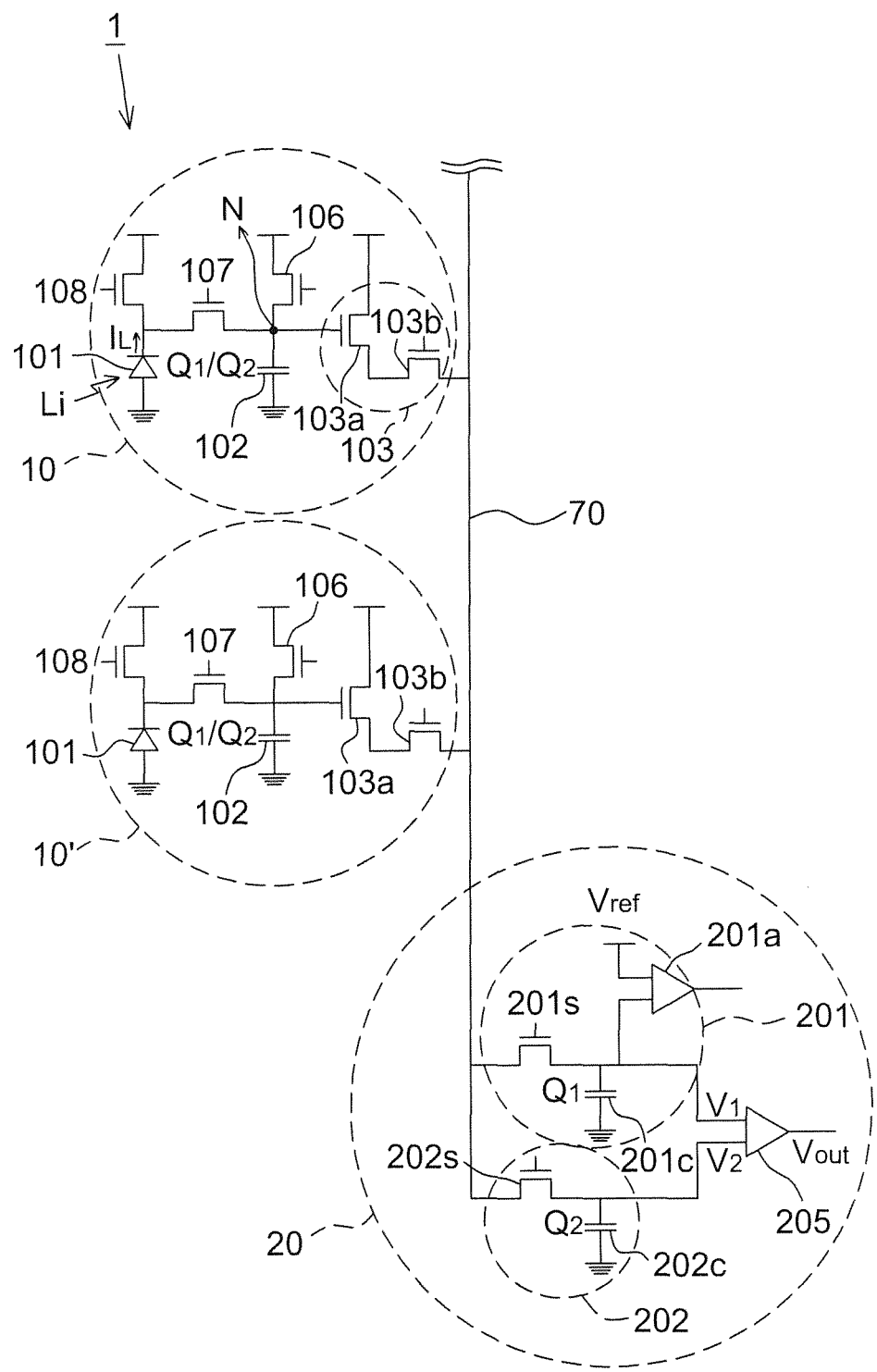
FIG. 2 is a circuit diagram of an image sensor according to some embodiments of the present disclosure.

FIG. 2 is a circuit diagram of an image sensor 1 according to some embodiments of the present disclosure. The image sensor 1 is configured to sense light energy and convert the light energy into an electrical signal. The image sensor 1 includes at least one optoelectronic conversion circuit 10 and an output circuit 20, wherein a bit line 70 is connected between an output terminal of the optoelectronic conversion circuit 10 and an input terminal of the output circuit 20. The image sensor 10 has a plurality of sensing pixels arranged in an array respectively including an optoelectronic conversion circuit 10, and output terminals of a plurality of optoelectronic conversion circuits in each column is electrically connected to an input terminal of an output circuit 20 through a bit line 70. For example, an image sensor including M×N sensing pixels has M×N optoelectronic conversion circuits and M or N output circuits and bit lines. For simplification, FIG. 2 exemplarily shows only two optoelectronic conversion circuits 10 and 10', one output circuit 20 and one bit line 70 in the image sensor 1. It is appreciated that although the optoelectronic conversion circuits 10 and 10' are indicated by different reference numerals to show two sensing pixels in one sensing pixel column of the image sensor 1 (e.g. a sensing pixel at a first row of a first column and a sensing pixel at a second row of the first column), both optoelectronic conversion circuits have an identical structure.

It should be mentioned that when capturing an image, the image sensor 1 works together with at least one light source (not shown in FIG. 2) which is configured to provide required light in the image capturing, and thus the light source is referred to a fill light (e.g. an LED). The image sensor 1 further includes a signal generator or a timing controller (not shown) configured to successively send a high level signal and a low level signal to turn on and turn off the light source, but not limited thereto. In other embodiments, the high level signal and the low level signal are provided to the image sensor 1 by an imaging system including the image sensor 1, e.g. provided by a control circuit of the imaging system. In some embodiments, the light source and the image sensor are included in a same image sensor package, and operations of the light source and the image sensor are both controlled by a timing controller. In some embodiments, the light source is located outside of the image sensor, and the image sensor generates the high level signal and the low level signal to control the light source. It should be mentioned that although a high level signal and a low level signal are respectively used herein, the signal generator, timing controller or control circuit mentioned above only generates the high level signal, and the low level signal is referred to no signal being generated, e.g. the signal value is equal to 0.

The optoelectronic conversion circuit 10 is configured to store a first charge $Q_1$ corresponding to a period of a high level signal and store a second charge $Q_2$ corresponding to a period of a low level signal, wherein the high level signal is configured to turn on the light source and the low level signal is configured to turn off the light source. That is to say, the light source is turned on when the optoelectronic conversion circuit 10 is storing the first charge $Q_1$, and the light source is turned off when the optoelectronic conversion circuit 10 is storing the second charge $Q_2$.

The optoelectronic conversion circuit 10 includes an optoelectronic element 101, a pixel capacitor 102 and a transfer circuit 103. The optoelectronic element 101 is, for example, a photodiode and configured to convert incident light $L_i$, into a photocurrent $I_L$, wherein the photocurrent $I_L$ is associated with intensity of the incident light L. The pixel capacitor 102 is served as a pixel buffer and configured to store the photocurrent $I_L$ as the first charge $Q_1$ or the second charge $Q_2$. It is appreciated that when the light source is turned on, the incident light $L_i$ includes light emitted from the light source and ambient light, and the optoelectronic element 101 converts the light emitted from the light source and the ambient light into the photocurrent $I_L$ and charges (i.e. the first charge $Q_1$) are stored in the pixel capacitor 102 accordingly. When the light source is turned off, the incident light $L_i$ includes only the ambient light, and then the optoelectronic element 101 converts the ambient light into the photocurrent $I_L$ and other charges (i.e. the second charge $Q_2$) are stored in the pixel capacitor 102 accordingly. It should be mentioned that the transfer circuit 103 is coupled between the pixel capacitor 102 and the output circuit 20. Before the pixel capacitor 102 stores the second charge $Q_2$, the transfer circuit 103 firstly transfers the first charge $Q_1$ from the pixel capacitor 102 to the output circuit 20, and the second charge $Q_2$ is then stored in the pixel capacitor 102.

In some embodiments, the transfer circuit 103 includes switching elements configured to control the charge transferring according to the opening and closing of the switching elements, e.g. a first gate 103a and a second gate 103b being shown in FIG. 2. When the first charge $Q_1$ or the second charge $Q_2$ is stored in the pixel capacitor 102, a node N in FIG. 2 has an electric potential (V=Q/C) corresponding to the first charge $Q_1$ or the second charge $Q_2$. To transfer the charges to the output circuit 20, the first gate 103a of the transfer circuit 103 is, for example, a source follower transistor and coupled to the node N to output the charges to the output circuit 20. On the other hand, since the optoelectronic conversion circuits 10 and 10' are both coupled to an identical output circuit (i.e. the output circuit 20), the second gate 103b of the optoelectronic conversion circuit 10 and that of the optoelectronic conversion circuit 10' are not switched on simultaneously so that the output circuit 20 successively receives the charges from the optoelectronic conversion circuit 10 and 10'.

In addition, in some embodiments, the optoelectronic conversion circuit 10 further includes a third gate 106, a fourth gate 107 and a fifth gate 108. The third gate 106 is coupled to the node N and configured to charge or discharge the pixel capacitor 102 to a predetermined electric quantity, and thus the third gate 106 is referred to a reset transistor. The fourth gate 107 is coupled between the optoelectronic element 101 and the pixel capacitor 102 and configured to control the photocurrent converted by the optoelectronic element 101 to be outputted to the pixel capacitor 102 so as to temporarily store the first charge $Q_1$ or the second charge $Q_2$ in the pixel capacitor 102. The fifth gate 108 is coupled to an output terminal of the optoelectronic element 101 and configured to release accumulated charges in the optoelectronic element 101 during an unexposed period (i.e. a period when the shutter is closed).

Referring to FIG. 2 continuously, the output circuit 20 includes a Oct storage circuit 201 and a second storage circuit 202 respectively configured to store the first charge $Q_1$ and the second charge $Q_2$ transferred from the optoelectronic conversion circuit 10 (or the optoelectronic conversion circuit 10'). In some embodiments, the first storage circuit 201 and the second storage circuit 202 respectively include a switching element and a storage capacitor. For example, the first storage circuit 201 includes a switching element 201s and a storage capacitor 201c, and the second storage circuit 202 includes a switching element 202s and a storage capacitor 202c as shown in FIG. 2. When the second gate 103b of the transfer circuit 103 is switched on, the switching element 201s or 202s is also switched on so as to transfer the first charge $Q_1$ from the pixel capacitor 102 to the storage capacitor 201c of the first storage circuit 201 or transfer the second charge $Q_2$ from the pixel capacitor 102 to the storage capacitor 202c of the second storage circuit 202. That is to say, the switching elements 201s and 202s are configured to control the first charge $Q_1$ and the second charge $Q_2$ in the optoelectronic conversion circuit 10 to be respectively transferred to the storage capacitors 201c and 202c for storage.

Therefore, after the transfer circuit 103 of the optoelectronic conversion circuit 10 transfers the first charge $Q_1$ from the pixel capacitor 102 to the first storage circuit 201 corresponding to the period of the low level signal, the optoelectronic conversion circuit 10 stores the second charge $Q_2$ to the pixel capacitor 102. Then, the transfer circuit 103 transfers the second charge to the second storage circuit 202.

The output circuit 20 further includes a differential unit 205 configured to compare the first charge $Q_1$ in the first storage circuit 201 with the second charge $Q_2$ in the second storage circuit 202 to output an analog image signal, wherein the First storage circuit 201 and the second storage circuit 202 are respectively coupled to two input terminals of the differential unit 205. The differential unit 205 is, for example, a differential amplifier. Accordingly, the output circuit 20 uses the differential unit 205 to perform an analog differencing between the first charge $Q_1$ in the first storage circuit 201 and the second charge $Q_2$ in the second storage circuit 202 to output the analog image signal. More specifically speaking, the first charge $Q_1$ stored in the storage capacitor 201c and the second charge $Q_2$ stored in the storage capacitor 202c respectively form an input voltage, e.g. a first voltage $V_1$ corresponding to the first charge $Q_1$ and a second voltage $V_2$ corresponding to the second charge $Q_2$, at the two input terminals of the differential unit 205. Then, an output voltage $V_{out}$ of the differential unit 205 is obtained by a conventional formula of the differential amplifier, e.g. $V_{out}=A_d \times (V_1-V_2)+A_c \times (V_1+V_2)/2$, wherein $A_d$ is referred to a differential-mode gain and $A_c$ is referred to a common-mode gain.

It is appreciated that an output terminal of the output circuit 20 is coupled to an analog to digital converter (not shown in FIG. 2) so as to convert the analog image signal to a digital image signal for a digital signal processor to perform digital image processing, but the present disclosure is not limited thereto. In other embodiments, the output terminal of the output circuit 20 is coupled to a logic circuit (e.g. configured to perform the image brightness adjustment, image rotation/cut, red-eye removal or the like) or a memory unit (e.g. configured to be stored as image data) according to different applications.

Since the first charge $Q_1$ is stored corresponding to the period of the high level signal (i.e. the light source being turned on and thus the incident light $L_i$ containing light emitted from the light source and ambient light) and the second charge $Q_2$ is stored corresponding to the period of the low level signal (i.e. the light source being turned off and thus the incident light $L_i$ only containing ambient light), noise due to the ambient light in the analog image signal outputted from the image sensor 1 has been removed (also been removed in the digital image signal) after the differential unit 205 of the output circuit 20 compares the first charge $Q_1$ with the second charge $Q_2$. Therefore, after the analog image signal is converted into the digital image signal, the digital image signal is directly processed at a digital backend (e.g. including the digital signal processor) and a digital image frame is generated accordingly. The differencing between two digital image frames is not necessary performed to eliminate the ambient light interference.

Figure 3:
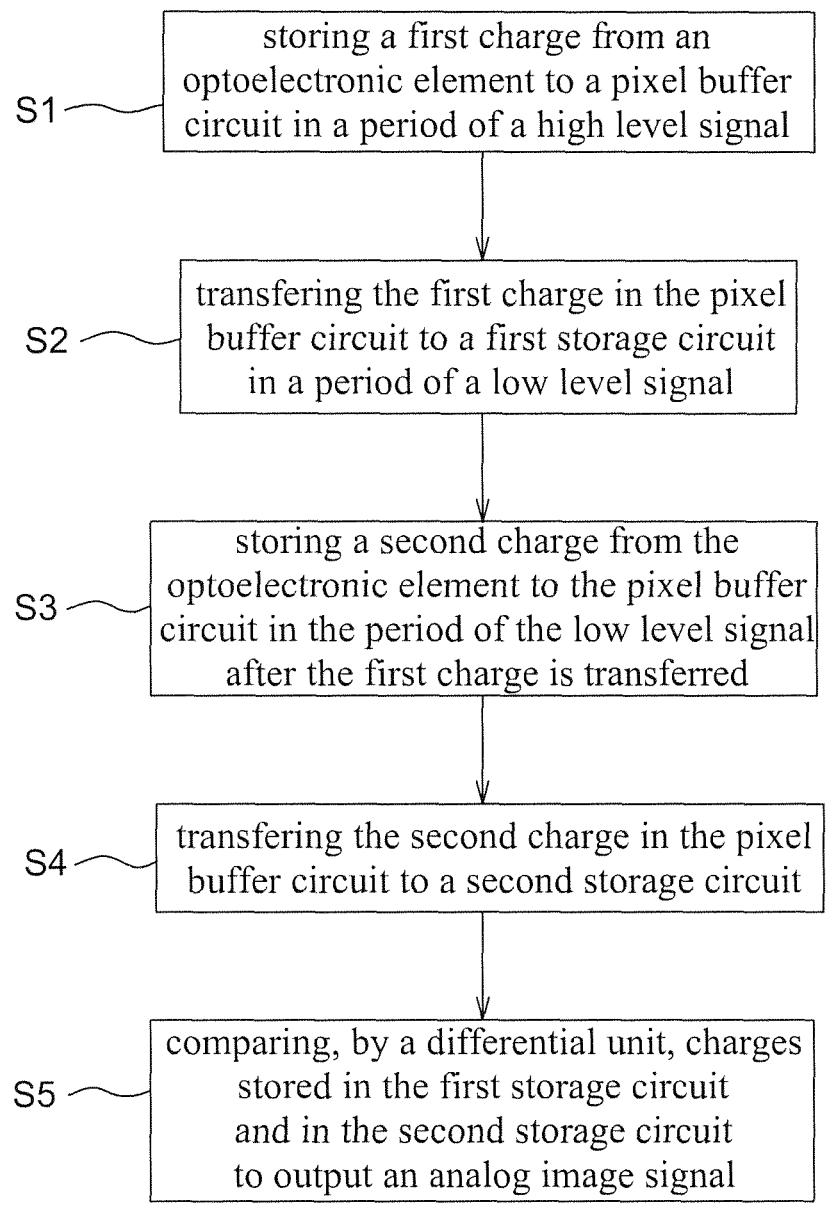
FIG. 3 is a flow chart of an operating method of an image sensor according to a first embodiment of the present disclosure.

In addition, an auto exposure is to adjust an exposure time corresponding to intensity of incident light. For example, when intensity of the incident light $L_i$ is too high, the image sensor 1 reduces the exposure time (or adjusts an aperture size, calibrates white balance, etc.) so as to avoid over exposure of the outputted image. In some embodiments, to implement the auto exposure, the first storage circuit 201 of the image sensor 1 further includes a comparator 201a configured to compare a voltage (i.e. the first voltage $V_1$) on the storage capacitor 201c with a reference voltage $V_{ref}$ to determine whether the auto exposure is performed, as shown in FIG. 2. For example, when the reference voltage $V_{ref}$ is larger than the first voltage $V_1$, the comparator 201a outputs a digital value 0 and the exposure time of the image sensor 1 is not adjusted; whereas, when the reference voltage $V_{ref}$ is equal to or smaller than the first voltage $V_1$, the comparator 201a outputs a digital value 1 so that the exposure time of the image sensor 1 is reduced, and vice versa FIG. 3 is a flow chart of an operating method of an image sensor according to a first embodiment of the present disclosure. The image sensor includes an optoelectronic element, a pixel buffer circuit, a first storage circuit, a second storage circuit and a differential unit. The first storage circuit and the second storage circuit are respectively coupled to two input terminals of the differential unit. The optoelectronic element is configured to generate photocurrents to be stored in the pixel buffer circuit corresponding to a high level signal and a low level signal, wherein the high level signal and the low level signal are configured to turn on and turn off a light source. The operating method includes the steps of: storing a first charge from the optoelectronic element to the pixel buffer circuit in a period of the high level signal (Step S1); transferring the first charge in the pixel buffer circuit to the first storage circuit in a period of the low level signal (Step S2); storing a second charge from the optoelectronic element to the pixel buffer circuit in the period of the low level signal after the first charge is transferred (Step S3); transferring the second charge in the pixel buffer circuit to the second storage circuit (Step S4); and comparing, by the differential unit, charges stored in the first storage circuit and in the second storage circuit to output an analog image signal (Step S5).

Figure 4:
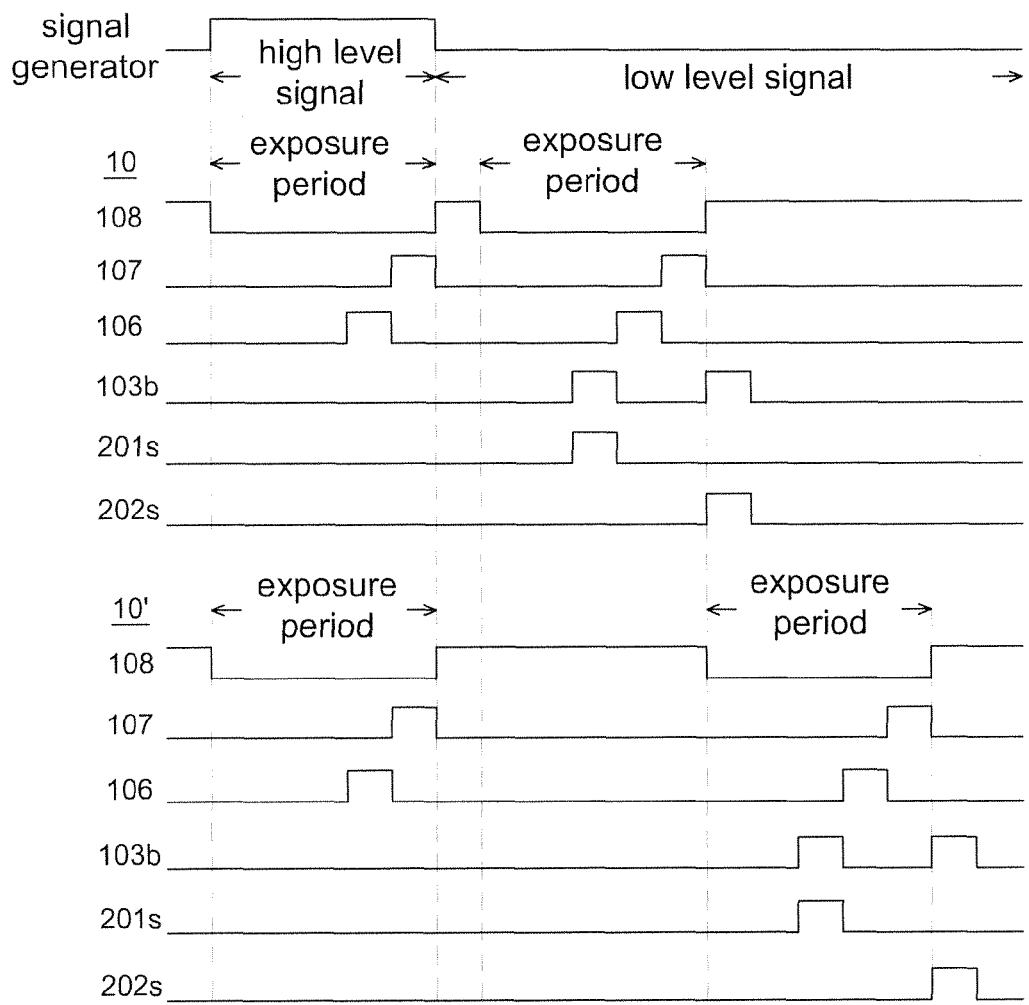
FIG. 4 is a timing diagram of an image sensor according to a first embodiment of the present disclosure.

In one embodiment, the operating method of the image sensor in FIG. 3 is applicable to the image sensor 1 of FIG. 2, wherein the optoelectronic element is the optoelectronic element 101 of the optoelectronic conversion circuit 10 (or the optoelectronic conversion circuit 10'), and the pixel buffer circuit includes the pixel capacitor 102 and the transfer circuit 103. Referring to FIGS. 2-4 together, FIG. 4 is a timing diagram corresponding to a plurality of switching elements in FIGS. 2 and 3, and the operating method of the image sensor is described below.

Step S1: Firstly, in the period of the high level signal (e.g. using a drive circuit to turn on a light source), the fifth gate 108 is switched off for a predetermined time so that a photocurrent $I_L$ generated by the optoelectronic element 101 is not released through the fifth gate 108, and thus the period during the fifth gate 108 is switched off (i.e. the predetermined time) is referred to an effective exposure time of the optoelectronic element 101. Then, the third gate 106 is switched on to charge or discharge the pixel capacitor 102 to a predetermined electric quantity. When the pixel capacitor 102 has the predetermined electric quantity, the third gate 106 is switched off and the fourth gate 107 is switched on. The optoelectronic element 101 stores the first charge $Q_1$ to the pixel buffer circuit (e.g. the pixel capacitor 102) in the period of the high level signal.

Similarly, the optoelectronic element 101 of the optoelectronic conversion circuit 10' also stores the first charge $Q_1$ to the pixel capacitor 102 of the optoelectronic conversion circuit 10' in the period of the high level signal. It should be mentioned that the first charge $Q_1$ stored in the optoelectronic conversion circuit 10 and the first charge $Q_1$ stored in the optoelectronic conversion circuit 10' are only intended to indicate charges stored corresponding to the period of the high level signal. Since the optoelectronic conversion circuits 10 and 10' are disposed at different positions of the image sensor 1, light energy received by the optoelectronic conversion circuits 10 and 10' are not necessary to be identical, and thus the first charge $Q_1$ of the optoelectronic conversion circuit 10 and the first charge $Q_1$ of the optoelectronic conversion circuit 10' are not necessary to be identical.

It should be mentioned that the optoelectronic element 101 converts the incident light into the photocurrent all the time, and thus the off-time of the fifth gate 108 (i.e. the predetermined time) is considered as the exposure time of the image sensor 1, but the present disclosure is not limited thereto. In other embodiments, the imaging system including the image sensor 1 sends a shutter signal to control the optoelectronic element 101 to start to generate or stop generating the photocurrent, and in this case the fifth gate 108 is not implemented in the image sensor 1.

Step S2: Then, in the period of the low level signal (e.g. turning off the light source or not to turn on the light source by the drive circuit), the fifth gate 108 of the optoelectronic conversion circuit 10 is switched off so that a photocurrent $I_L$ generated by the optoelectronic element 101 is not released through the fifth gate 108. The difference between the period of the low level signal and the period of the high level signal is that before the third gate 106 is switched on to reset the pixel capacitor 102 in the period of the low level signal, the second gate 103b and the first switch 201s of the first storage circuit 201 are switched on at the same time so as to transfer the first charge $Q_1$ of the pixel capacitor 102 to the storage capacitor 201c of the first storage circuit 201.

As mentioned above, in some embodiments, after the first charge $Q_1$ is transferred (i.e. after Step S2), the comparator 201a included in the first storage circuit 201 compares the voltage of the storage capacitor 201c with the reference voltage $V_{ref}$ to determine whether the auto exposure is performed.

Step S3: After the first charge $Q_1$ is transferred from the pixel capacitor 102 to the first storage circuit 201, the second gate 103b and the first switch 201s are switched off and the third gate 106 is switched on to charge or discharge the pixel capacitor 102 to the predetermined electric quantity. When the pixel capacitor 102 has the predetermined electric quantity, the third gate 106 is switched off and the fourth gate 107 is switched on, and then the optoelectronic element 101 stores the second charge $Q_2$ to the pixel buffer circuit (e.g. the pixel capacitor 102).

Step S4: After the second charge $Q_2$ is stored in the pixel capacitor 102, the second gate 103b and the second switch 202s are switched on at the same time to transfer the second charge $Q_2$ in the pixel capacitor 102 in the optoelectronic conversion circuit 10 to the second storage circuit 202. It is appreciated that the image sensor 1 transfers the first charge $Q_1$ from the pixel buffer circuit to the first storage circuit 201 through the transfer circuit 103 and the first switch 201s and transfers the second charge $Q_2$ to the second storage circuit 202 through the transfer circuit 103 and the second switch 202s. Meanwhile, the storage capacitor 201c of the first storage circuit 201 and the storage capacitor 202c of the second storage circuit 202 respectively store the first charge $Q_1$ and the second charge $Q_2$, and form the first voltage $V_1$ and the second voltage $V_2$ at the two input terminals of the differential unit 205.

Step S5: Finally, the differential unit 205 compares the first voltage $V_1$ of the first storage circuit 201 with the second voltage $V_2$ of the second storage circuit 202 to output an analog image signal. Accordingly, noise due to ambient light is eliminated before the analog image signal is converted into a digital image signal by an analog to digital converter.

In some embodiments, a time interval between the first charge $Q_1$ being stored in the first storage circuit 201 and the second charge $Q_2$ being stored in the second storage circuit 202 is as short as possible to prevent the first charge $Q_1$ stored in the storage capacitor 201c from attenuation before the second charge $Q_2$ is stored in the storage capacitor 202s. Accordingly, the differential unit 205 outputs an accurate analog image signal according to the first voltage $V_1$ and the second voltage $V_2$. For example, the time interval is smaller than or equal to the off-time of the fifth gate 108 (i.e. the predetermined time or the period of the high level signal).

It should be mentioned that since the optoelectronic conversion circuits 10 and 10' are coupled to an identical output circuit (i.e. the output circuit 20), the optoelectronic conversion circuit 10' does not transfer the first charge $Q_1$ or the second charge $Q_2$ therein to the output circuit 20 when the optoelectronic conversion circuit 10 is transferring the first charge $Q_1$ or the second charge $Q_2$ therein to the output circuit 20. Therefore, the image sensor 1 successively switches on the second gate 103b and the first switch 201s of the optoelectronic conversion circuit 10, the second gate 103b and the second switch 202s of the optoelectronic conversion circuit 10, the second gate 103b and the first switch 201s of the optoelectronic conversion circuit 10', and the second gate 103b and the second switch 202s of the optoelectronic conversion circuit 10' so that the first charge $Q_1$ and the second charge $Q_2$ in the optoelectronic conversion circuit 10 and the first charge $Q_1$ and the second charge $Q_2$ in the optoelectronic conversion circuit 10' are transferred sequentially, as shown in FIG. 4. When a column of sensing pixels includes a plurality of sensing pixels coupled to one output circuit 20, the image sensor 1 sequentially switches on the second gate 103b, the first switch 201s and the second switch 202s of every optoelectronic conversion circuit 10.

It is appreciated that the first charge $Q_1$ stored in the optoelectronic conversion circuit 10' corresponding to the period of the high level signal (i.e. a period when the fifth gate 108 is switched off at a first time) is transferred to the output circuit 20 in a period when the fifth gate 108 is switched off at a second time. Therefore, the second gate 103b of the optoelectronic conversion circuit 10' remains the switched-off state before the optoelectronic conversion circuit 10 transfers the second charge $Q_2$ to the output circuit 20. In some embodiments, a control signal (e.g. sent from the image sensor 1 or the imaging system) controls the fifth gates 108 of the optoelectronic conversion circuits 10 and 10' to be switched off at the same time in the period of the high level signal. Then, in the period of the low level signal, the control signal successively switches off the fifth gate 108 of the optoelectronic conversion circuit 10 and the fifth gate 108 of the optoelectronic conversion circuit 10'. As mentioned above, the period during which the fifth gate 108 is switched off is referred to an effective exposure time of the optoelectronic element 101. That is to say, the optoelectronic conversion circuits 10 and 10' of the image sensor 1 are simultaneously exposed in the period of the high level signal, and then the optoelectronic conversion circuits 10 and 10' are successively exposed in the period of the low level signal.

Figure 5:
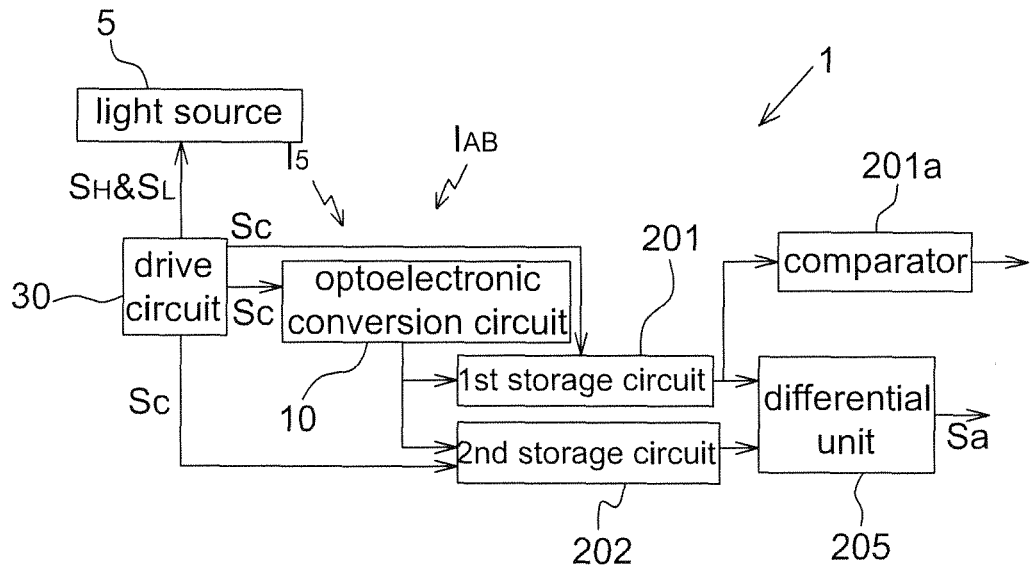
FIG. 5 is a block diagram of an image sensor according to some embodiments of the present disclosure.

FIG. 5 is a schematic block diagram of an image sensor 1 according to some embodiments of the present disclosure. The image sensor 1 includes a drive circuit 30, an optoelectronic conversion circuit 10, a first storage circuit 201, a second storage circuit 202 and a differential unit 205, wherein the drive circuit 30 is electrically connected with the optoelectronic conversion circuit 10, input terminals of the first storage circuit 201 and the second storage circuit 202 are both coupled to an output terminal of the optoelectronic conversion circuit 10, and the differential unit 205 includes two input terminals respectively coupled to the first storage circuit 201 and the second storage circuit 202.

The drive circuit 30 is, for example, a signal generator or a timing controller configured to successively generate a high level signal $S_H$ and a low level signal $S_L$, wherein the high level signal $S_H$ and the low level signal $S_L$ are respectively configured to turn on a light source 5 in a first period and turn off the light source 5 in a second period. Besides, the drive circuit 30 also generates at least one control signal $S_c$ to control the opening and closing of a plurality of switching elements in the optoelectronic conversion circuit 10, the first storage circuit 201 and the second storage circuit 202, e.g. to control the second gate 103b, the third gate 106, the fourth gate 107, the fifth gate 108, the first switch 201s and the second switch 202s in FIGS. 2 and 4 to be switched on and off. In other embodiments, an imaging system including the image sensor 1 further provides a control circuit to turn on and turn off the light source 5, and the control signal of the light source 5 is sent to the drive circuit 30 of the image sensor 1 to allow the drive circuit 30 to correspondingly control the switching elements.

When the light source 5 is turned on in the first period, the optoelectronic conversion circuit 10 receives light source intensity $I_S$ and ambient light intensity $I_{AB}$ together. When the light source 5 is turned off in the second period, the optoelectronic conversion circuit 10 receives only the ambient light intensity $I_{AB}$. Accordingly, the optoelectronic conversion circuit 10 generates a photocurrent corresponding to the light source 5 and ambient light in the first period and generates a photocurrent corresponding to the ambient light in the second period. It should be mentioned that said light source intensity $I_S$ is caused by reflected light from an object to be detected, i.e. the light source 5 in the present disclosure being configured to illuminate an object to be detected.

Then, in the second period the first storage circuit 201 stores a first charge corresponding to the photocurrent of the first period. The second storage circuit 202 stores a second charge corresponding to the photocurrent of the second period after the first charge is stored. It is appreciated that the first charge is associated with the light source intensity $I_S$ and the ambient light intensity $I_{AB}$, whereas the second charge is associated with the ambient light intensity $I_{AB}$ only.

Finally, the differential unit 205 compares charges stored in the first storage circuit 201 and in the second storage circuit 202 (e.g. the first charge $Q_1$ and the second charge $Q_2$ in FIG. 2) to eliminate noise due to the ambient light and outputs an analog image signal Sa. In some embodiments, the differential unit 205 directly performs an analog differencing between charges stored in the first storage circuit 201 and in the second storage circuit 202 and outputs the analog image signal Sa.

Similarly, in some embodiments, to implement an auto exposure, the first storage circuit 201 further includes a comparator 201a configured to compare a voltage of a storage capacitor in the first storage circuit 201 with a reference voltage to determine whether the auto exposure is performed. It should be mentioned that although the comparator 201a is shown to be coupled between the first storage circuit 201 and the differential unit 205 in FIG. 5, the coupled position does not have particular limitations as long as the comparator 201a is coupled to the voltage of the storage capacitor in the first storage circuit 201.

Figure 6:
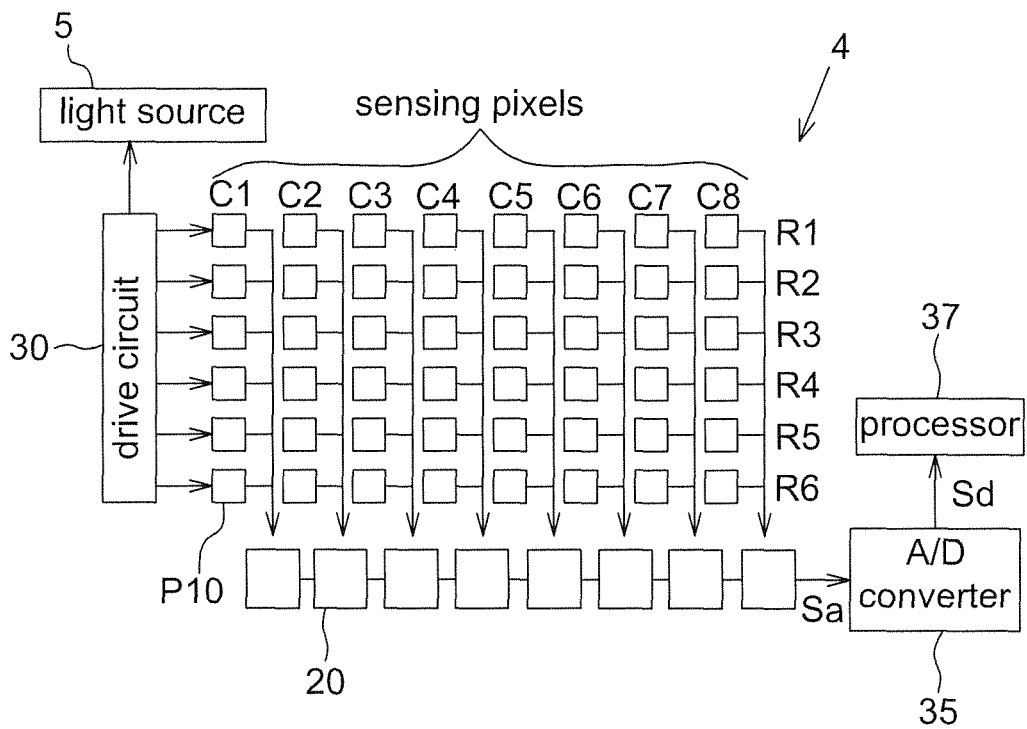
FIG. 6 is a schematic diagram of an imaging system including a plurality of sensing pixels according to some embodiments of the present disclosure.
Figure 7:
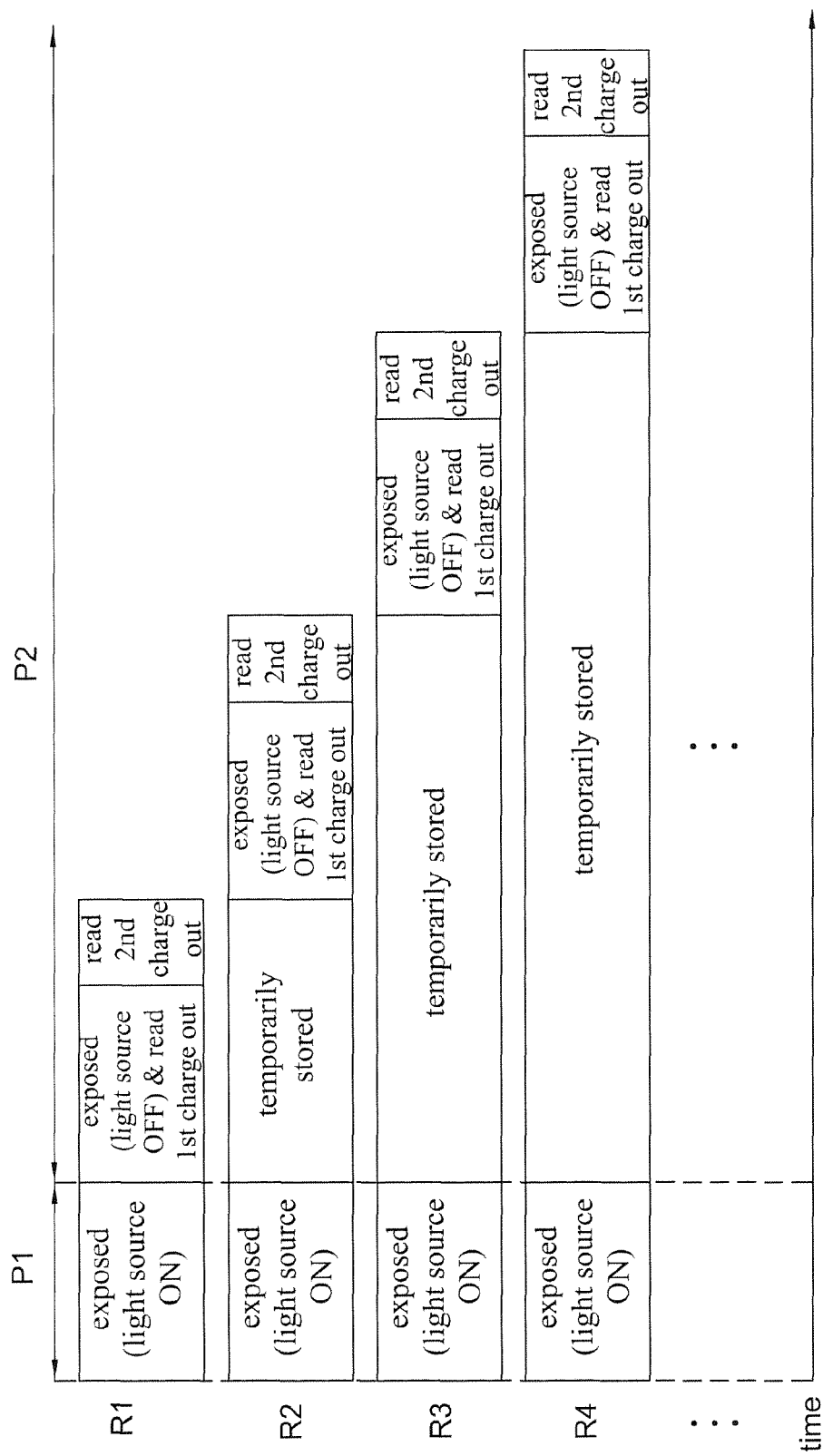
FIG. 7 is another timing diagram of an image sensor according to a first embodiment of the present disclosure.

As mentioned above, the image sensor according to some embodiments of the present disclosure has a plurality of sensing pixels arranged in an array each including an optoelectronic conversion circuit. Referring to FIGS. 6 and 7, FIG. 6 is a schematic diagram of an imaging system 4 including a plurality of sensing pixels according to some embodiments of the present disclosure, and FIG. 7 is a timing diagram corresponding to FIG. 6. The imaging system 4 includes a light source 5, a drive circuit 30 (or a control circuit), a plurality of sensing pixels P10 arranged in 6×8 array, a plurality of output circuits 20, an analog to digital converter 35 and a processor 37, wherein a first row of the sensing pixels P10 are referred to a row of sensing pixels $R_1$, a second row of the sensing pixels P10 are referred to a row of sensing pixels $R_2$, and so on; and a first column of the sensing pixels P10 are referred to a column of sensing pixels $C_1$, a second column of the sensing pixels P10 are referred to a column of sensing pixels $C_2$, and so on.

When the drive circuit 30 turns on the light source 5 in a first period $P_1$. the drive circuit 30 simultaneously controls all of the optoelectronic conversion circuits 10 to be exposed (i.e. closing the fifth gate 108) such that a plurality of first charges are stored.

When the drive circuit 30 turns off the light source 5 in a second period $P_2$, the drive circuit 30 firstly controls the first row of the optoelectronic conversion circuits 10 (i.e. the row of sensing pixels $R_1$) to transfer the first charges therein to the output circuits 20, controls the row of sensing pixels $R_1$ to be exposed again to store a plurality of second charges and transfers the plurality of second charges to the output circuits 20 so that the output circuits 20 compare each first charge with the corresponded second charge to output an analog image signal Sa corresponding to the row of sensing pixels $R_1$. Then, the drive circuit 30 successively controls the second to sixth rows of the optoelectronic conversion circuits 10 to output the analog image signals Sa corresponding to the row of sensing pixels $R_2$ to the row of sensing pixels $R_6$, as shown in FIG. 7.

In some embodiments, an amplifier is disposed at an input terminal of the analog to digital converter 35 in the imaging system 4 and configured to amplify the analog image signals Sa. Finally, after the analog image signals Sa pass through the analog to digital converter 35, the processor 37 outputs an image according to digital image signals $S_d$ corresponding to the sensing pixels P10 (i.e. the optoelectronic conversion circuits 10). It is appreciated that noise due to ambient light in the image outputted from the imaging system 4 is removed.

In some embodiments, the first storage circuit 201 and the second storage circuit 202 respectively include a switching element and a storage capacitor. The switching element is configured to control the first charge and the second charge in the optoelectronic conversion circuit 10 to be transferred to the storage capacitor.

In some embodiments, the first storage circuit 201 further includes a comparator configured to compare a voltage of the storage capacitor with a reference voltage to implement an auto exposure.

In some embodiments, the image sensor 1 further includes a drive circuit to successively generate the high level signal and the low level signal.

In the above first embodiment, the image sensor 1 is configured as a global shutter image sensor and operates in conjunction with a light source 5. In a second embodiment below, the image sensor 1 is configured as a rolling shutter image sensor and does not operate in conjunction with a light source. For example, the image sensor 1 of the second embodiment is applicable to a motion sensor.

Referring to FIGS. 2, 5-6 and 8, FIG. 8 is a timing diagram of an image sensor according to a second embodiment of the present disclosure. The circuit structure of the image sensor of the second embodiment is identical to that of the first embodiment, and the difference is that the signal timing sent from the drive circuit 30 is different such that the image sensor of the first embodiment is applicable to the global shutter operation whereas the image sensor of the second embodiment is applicable to the rolling shutter operation. Accordingly, image sensors 1 of the first embodiment and the second embodiment are indicated by a same reference numeral.

As shown in FIGS. 5-6, the image sensor 1 includes a plurality of sensing pixels P10, a plurality of optoelectronic conversion circuits 10 and a plurality of output circuits 20. The sensing pixels P10 are arranged in an array so as to form a plurality of rows of sensing pixels (e.g. R1 to R6) and a plurality of columns of sensing pixels (e.g. C1 to C8), wherein each of the sensing pixels P10 includes one optoelectronic conversion circuit 10 and each column of sensing pixels C1 to C8 is coupled to one output circuit 20.

The optoelectronic conversion circuit 10 includes an optoelectronic element 101, a pixel capacitor 102 and a transfer circuit 103, as shown in FIG. 2. As mentioned above, the pixel capacitor 102 and the transfer circuit 103 forms a pixel buffer circuit. The optoelectronic element 101 is configured to output a photocurrent I. The pixel capacitor 103 is configured to store the photocurrent $I_L$ as the first charge $Q_1$ or the second charge $Q_2$. In this embodiment, the first charge $Q_1$ is stored in the pixel capacitor 102 for a storing period. The transfer circuit 103 is coupled between the pixel capacitor 102 and the output circuit 20. and configured to control the pixel capacitor 102 to output the first charge $Q_1$ and the second charge $Q_2$ to a bit line 70.

The output circuit 20 includes a first storage circuit 201 and a second storage circuit 202, and thus each column of sensing pixels C1 to C8 is coupled to one first storage circuit 201 and one second storage circuit 202, e.g. via the bit line 70. The first storage circuit 201 and the second storage circuit 202 are configured to temporarily store the first charge $Q_1$ and the second charge $Q_2$ transferred from the optoelectronic conversion circuit 10 before the differential operation.

Figure 8:
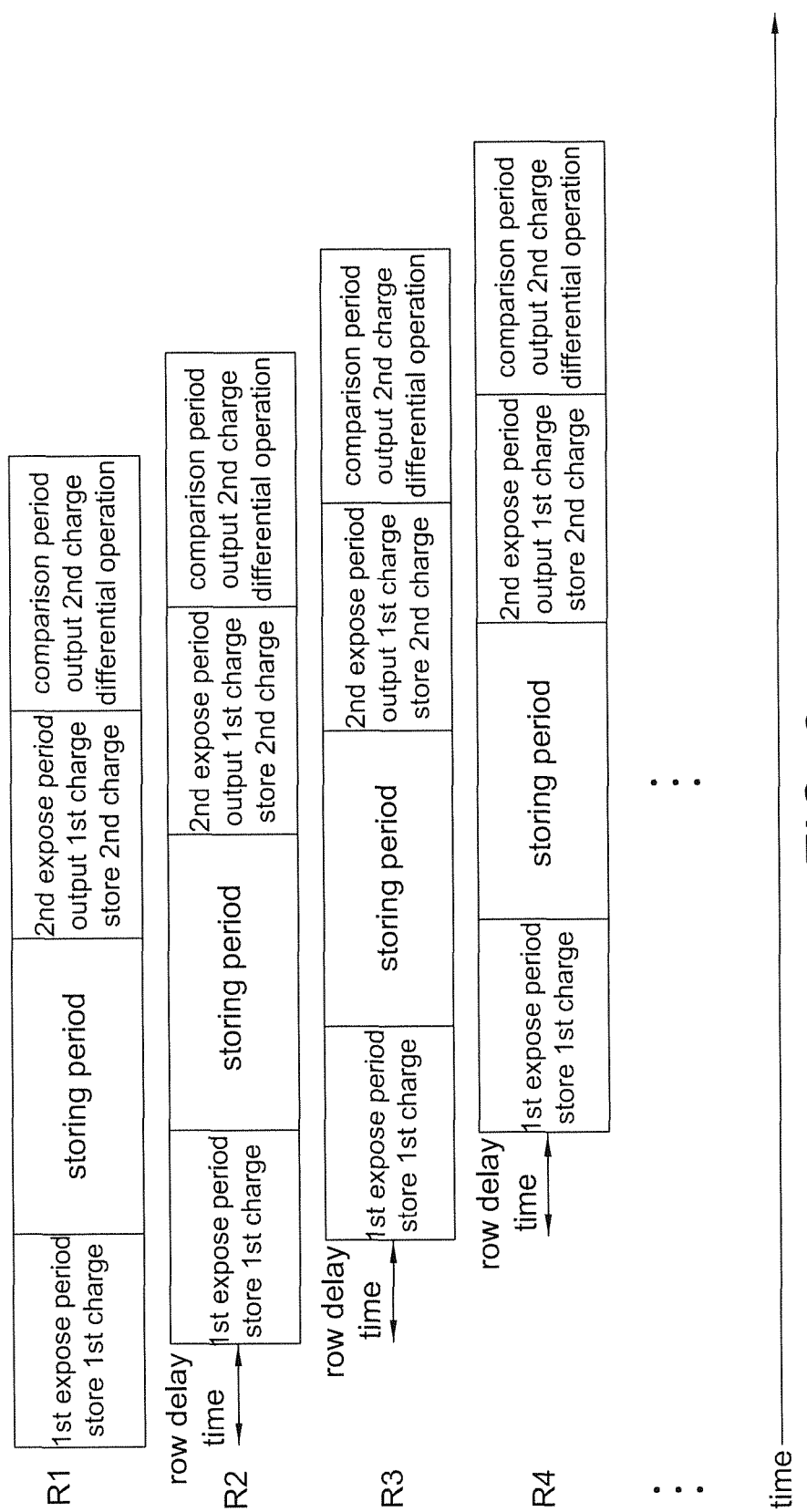
FIG. 8 is a timing diagram of an image sensor according to a second embodiment of the present disclosure.

In the second embodiment, each of the optoelectronic conversion circuits 10 is configured to store a first charge $Q_1$ corresponding to a first exposure period and store the first charge $Q_1$ for a storing period, successively output the first charge $Q_1$ (e.g. to the bit line 70) and store a second charge $Q_2$ corresponding to a second exposure period, and output the second charge $Q_2$ (e.g. to the bit line 70), wherein the storing period is between the first exposure period and the second exposure period as shown in FIG. 8.

In this embodiment, as the image sensor 1 is a rolling shutter image sensor, a start time of the first exposure period (e.g. a time turning off the fifth gate 108) of every row of sensing pixels (e.g. R1 to R4 in FIG. 8) has a row delay time from each other. The operations of every row of sensing pixels are identical except with the row delay time. Accordingly, the storing periods o f every row of sensing pixels are identical. Since the second embodiment is applied to a motion sensor, a time interval between the first exposure period and the second exposure period is not zero, i.e. the storing period is larger than zero. In addition, according to different detecting sensitivity, the storing period is preferably adjustable. For example, when a higher sensitivity is required. the storing period is shortened, and when a lower sensitivity is required, the storing period is extended, but not limited thereto.

As mentioned above, each of the output circuits 20 includes a first storage circuit 201 and a second storage circuit 202 respectively configured to store the first charge $Q_1$ and the second charge $Q_2$ transferred from the optoelectronic conversion circuit 10. The output circuits 20 are also configured to compare the first charge $Q_1$ in the first storage circuit 201 with the second charge $Q_2$ in the second storage circuit 202 so as to output an analog image signal Sa. For example, the output circuit 20 further includes a differential unit 205 configured to compare the first charge $Q_1$ in the first storage circuit 201 with the second charge $Q_2$ in the second storage circuit 202, wherein the first storage circuit 201 and the second storage circuit 202 are, for example, coupled to two input terminals of the differential unit 205.

The first storage circuit 201 and the second storage circuit 202 respectively include a switching element 201s, 202s and a storage capacitor 201c, 202c. The switching elements 201s, 202s are configured to control the first charge $Q_1$ and the second charge $Q_2$ in the optoelectronic conversion circuit 10 to be transferred (e.g. via the bit line 70) to the storage capacitors 201c, 202c for the differential unit 205 to read the voltage thereon to perform the differential operation.

In addition, as mentioned above, in order to implement the auto exposure, the first storage circuit 201 or the second storage circuit 202 further includes a comparator 201a configured to compare a voltage of the storage capacitor 201c or 202c with a reference voltage Vref. As the present embodiment does not operate in conjunction with a light source, the comparator 201a is coupled to one of the first storage circuit 201 and the second storage circuit 202 without particular limitations.

An output terminal of the output circuit 20 is coupled to an analog to digital converter 35 to convert the analog image signal Sato a digital image signal Sd. The digital image signal Sd is provided to a processor 37 for post-processing, wherein the processor 37 is, for example, a digital signal processor (DSP), a microcontroller (MCU), a central processing unit (CPU) or other devices for processing digital signals.

Figure 9:
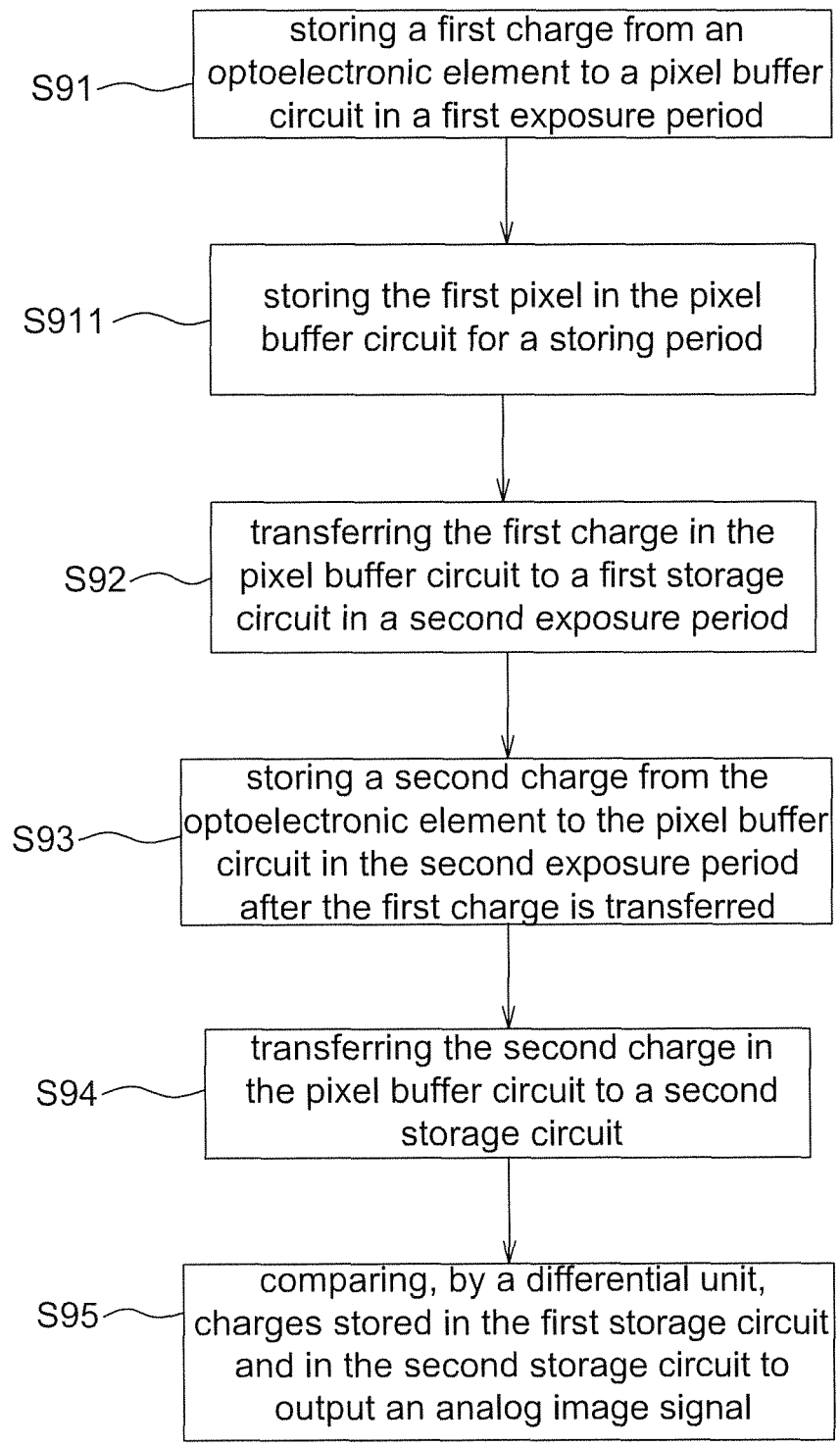
FIG. 9 is a flow chart of an operating method of an image sensor according to a second embodiment of the present disclosure.

Referring to FIG. 9, it is a flow chart of an operating method of an image sensor according to a second embodiment of the present disclosure. Referring to FIGS. 2 and 5-6, the image sensor 1 of this embodiment includes a plurality of optoelectronic elements 101, a plurality of pixel buffer circuit, a plurality of first storage circuits 201, a plurality of second storage circuits 202 and a plurality of differential circuits 250. The first storage circuits 201 and the second storage circuits 202 are respectively coupled to the differential units 205. The optoelectronic elements 101 are configured to generate a photocurrent $I_L$ to the pixel buffer circuits, wherein each of the pixel buffer circuits includes a pixel capacitor 102 and a transfer circuit 103.

The operating method of this embodiment includes the steps of: storing a first charge from an optoelectronic element to a pixel buffer circuit within a first exposure period (Step S91); storing the first pixel in the pixel buffer circuit for a storing period (Step S911); transferring the first charge in the pixel buffer circuit to a first storage circuit within a second exposure period (Step S92); storing a second charge from the optoelectronic element to the pixel buffer circuit within the second exposure period after the first charge is transferred (Step S93); transferring the second charge in the pixel buffer circuit to a second storage circuit (Step S94); and comparing, by a differential unit, charges stored in the first storage circuit and in the second storage circuit to output an analog image signal (Step S95).

Figure 10:
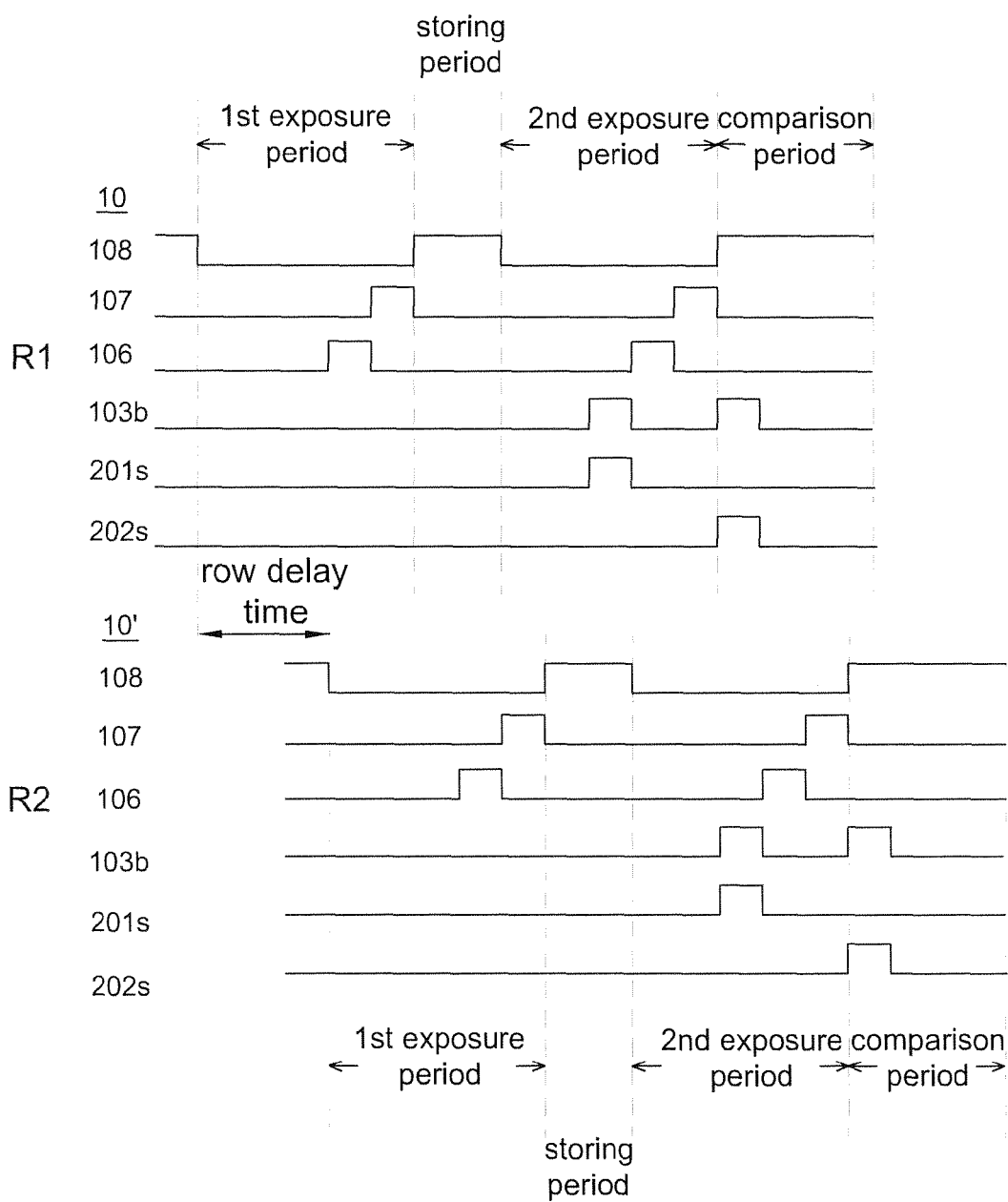
FIG. 10 is another timing diagram of an image sensor according to a second embodiment of the present disclosure.

Referring to FIGS. 2, 5-6 and 9-10. FIG. 10 is another timing diagram of an image sensor according to a second embodiment of the present disclosure. Details of this embodiment is then described, wherein operations of two adjacent rows of sensing pixels, e.g. two rows of sensing pixels R1 and R2 shown in FIG. 10, are identical except with a row delay time. Meanwhile, operations of all sensing pixels in every row of sensing pixels are identical. Accordingly, the descriptions are made using one sensing pixel P10 (which includes an optoelectronic conversion circuit 10) and one output circuit 20 herein. In addition, the control signal (e.g. signals shown in FIG. 10) in this embodiment is generated, for example, by the drive circuit 30 shown in FIGS. 5-6.

Step S91: Firstly, in a first exposure period, the fifth gate 108 is switched off for a predetermined time so that a photocurrent $I_L$ generated by the optoelectronic element 101 is not released through the fifth gate 108, and thus the period during the fifth gate 108 is switched off (i.e. the first exposure period) is referred to an effective exposure time of the optoelectronic element 101. Then, the third gate 106 is switched on to reset the pixel capacitor 102 to a predetermined electric potential or for a predetermined interval. Next, the third gate 106 is switched off and the fourth gate 107 is switched on. Thus, the optoelectronic element 101 stores a first charge $Q_1$ to the pixel capacitor 102 of the pixel buffer circuit within the first exposure period.

Step S911: As the image sensor 1 of this embodiment is applicable to a motion sensor, the first charge $Q_1$ is stored in the pixel capacitor 102 of the pixel buffer circuit for a storing period before a next exposure, wherein the storing period is preferably adjustable according to different applications and the fifth gate 108 is turned on in the storing period.

Step S92: After the first charge $Q_1$ is stored in the pixel buffer circuit for the storing period, within a second exposure period, the fifth gate 108 of the optoelectronic conversion circuit 10 is switched off so that a photocurrent $I_L$ generated by the optoelectronic element 101 is not released through the fifth gate 108. In the second exposure period, before the third gate 106 is switched on to reset the pixel capacitor 102. the second gate 103b and the first switch 201s of the first storage circuit 201 are switched on at the same time so as to transfer the first charge $Q_1$ of the pixel capacitor 102 to the storage capacitor 201c of the first storage circuit 201. In other words, in this step the transfer circuit 103 of the pixel buffer circuit controls the first charge $Q_1$ in the pixel buffer circuit to be outputted to a bit line 70, and the switching element 201s of the first storage circuit 201 controls the first charge $Q_1$ of the pixel buffer circuit to be transferred to the storage capacitor 201c via the bit line 70.

Step S93: After the first charge $Q_1$ is transferred from the pixel capacitor 102 to the first storage circuit 201, the second gate 103b and the first switch 201s are switched off and the third gate 106 is switched on to reset the pixel capacitor 102 to a predetermined electric potential or for a predetermined interval. Next, the third gate 106 is switched off and the fourth gate 107 is switched on, and then the optoelectronic element 101 stores a second charge $Q_2$ to the pixel capacitor 102 of the pixel buffer circuit.

Step S94: After the second charge $Q_2$ is stored in the pixel capacitor 102, the second gate 103b and the second switch 202s are switched on at the same time to transfer the second charge $Q_2$ in the pixel capacitor 102 of the pixel buffer circuit to the second storage circuit 202, wherein the method of the image sensor 1 transferring the second charge $Q_2$ from the pixel buffer circuit to the second storage circuit 202 is identical to that of transferring the first charge $Q_1$ from the pixel buffer circuit to the first storage circuit 201. That is, in this step the transfer circuit 103 of the pixel buffer circuit controls the second charge $Q_2$ in the pixel buffer circuit to be outputted to a bit line 70, and the switching element 202s of the second storage circuit 202 controls the second charge $Q_2$ of the pixel buffer circuit to be transferred to the storage capacitor 202c via the bit line 70. However, preferably the transferring is started immediately when the pixel capacitor 102 has stored the second charge $Q_2$ (e.g. switching on the fourth gate 107 for a predetermined interval). For example, FIG. 10 shows that times of switching on the second gate 103b and the second switching element 202s are substantially identical to a time of switching off the fourth gate 107 so as to shorten an interval during which the first charge $Q_1$ is being stored in the first storage circuit 201 and the second charge $Q_1$ is being stored in the pixel capacitor 102 as much as possible thereby reducing the charge leakage.

Meanwhile, the storage capacitor 201c of the first storage circuit 201 and the storage capacitor 202c of the second storage circuit 202 respectively store the first charge $Q_1$ and the second charge $Q_2$, and form the first voltage $V_1$ and the second voltage $V_2$ at two input terminals of the differential unit 205.

Step 395: Finally, the differential unit 205 compares the first voltage $V_1$ in the first storage circuit 201 with the second voltage $V_2$ in the second storage circuit 202 to output an analog image signal Sa. Similarly, the differential operation is preferably started immediately after the second charge $Q_2$ is transferred to the storage capacitor 202c so as to shorten an interval during which the first charge $Q_1$ is being stored in the first storage circuit 201 and the second charge $Q_2$ is being stored in the second storage circuit 202 as much as possible thereby reducing the charge leakage.

Finally, the analog image signal Sa is inputted into an analog to digital converter 35 to convert the analog image signal Sa to a digital image signal Sd.

In addition, the output circuit 20 of this embodiment further includes a comparator 201a coupled to one of two input terminals of the differential unit 205, and is configured to compare a first voltage $V_1$ of the storage capacitor 201c of the first storage circuit 201 or a second voltage $V_2$ of the storage capacitor 202c of the second storage circuit 202 with a reference voltage Vref to adjust the exposure time.

Figure 11A:
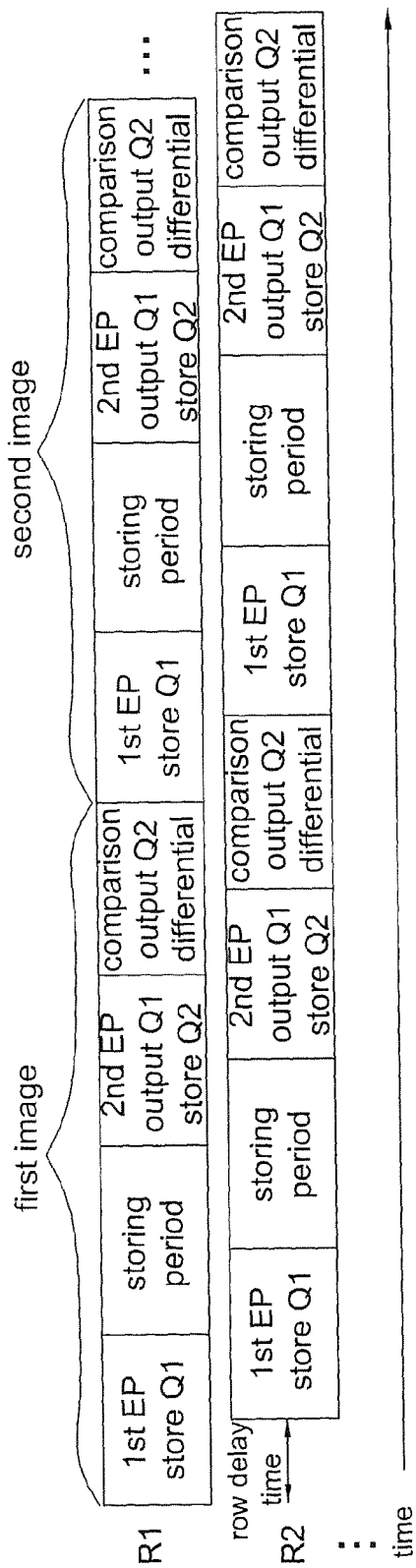
FIGS. 11A-11B are timing diagrams of successively capturing images by an image sensor according to a second embodiment of the present disclosure.
Figure 11B:
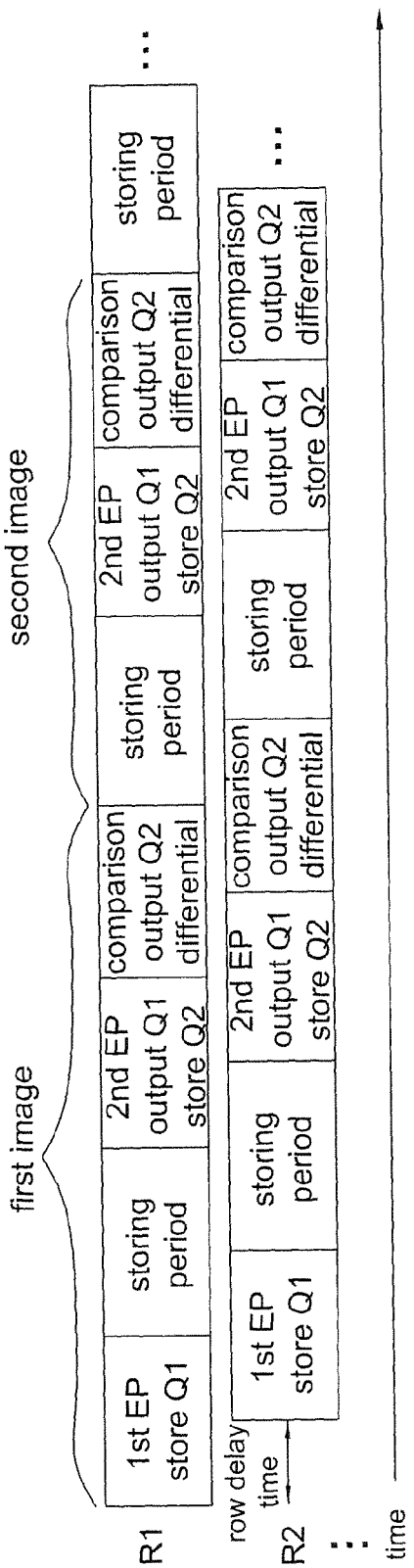

In successively capturing images, the image sensor 1 outputs an image according to the operations of FIGS. 8 and 10, and there are two ways to capture other images after the image is captured. Referring to FIGS. 11A and 11B, they are timing diagrams of successively capturing images by an image sensor according to a second embodiment of the present disclosure.

In a first way, the image sensor 1 outputs every image according to the operations of FIGS. 8 and 10, as shown in FIG. 11A. For example, transferring the second charge $Q_2$ and comparing the stored charges $Q_1$ and $Q_2$ are performed within a comparison period, and every image captured by the image sensor 1 includes the first exposure period (1st EP), the storing period, the second exposure period (2nd EP) and the comparison period. wherein the control signals are similar to those shown in FIG. 10 and thus details thereof are not repeated herein.

In a second way, a first image captured by the image sensor 1 includes the first exposure period, the storing period, the second exposure period and the comparison period, and images (e.g. a second image) captured after the first image by the image sensor 1 includes the storing period, the second exposure period and the comparison period but do not include the first exposure period, as shown in FIG. 11B. Accordingly, the frame rate is increased. More specifically, in this embodiment the second charge $Q_2$ stored in the second exposure period of the first image is not reset after the first image is generated and continuously served as a new first charge of the second image. Accordingly, the image sensor 1 only needs to store a new second charge in another second exposure period, wherein the storing period, the second exposure period and the comparison period of the second image are identical to those of the first image, referring to FIG. 10 for example, and thus details thereof are not repeated herein.

The present disclosure further provides a motion sensor which includes the image sensor 1, the analog to digital converter 35 and a processor 37 of the second embodiment, i.e. the imaging system 4 of FIG. 6 is configured as the motion sensor of this embodiment. The image sensor 1 is, for example, a rolling shutter image sensor and outputs a plurality of analog image signals Sa according to the Steps S91-S95 of FIG. 9. The analog to digital converter 35 is configured to convert the analog image signals Sa to a plurality of digital image signals Sd. The processor 37 is configured to calculate sensing pixel positions (e.g. positions of center of gravity) of the digital image signals Sd in one image frame having a nonzero brightness (e.g. gray level) to accordingly identify a motion position.

In another embodiment, the processor 37 is configured to calculate a pixel number of the digital image signals Sd corresponding to the sensing pixels in one image frame which have a nonzero brightness to accordingly identify an object motion. For example, the processor 37 is configured to compare the pixel number with at least one number threshold to as to identify whether an object motion occurs. In some embodiments, the number threshold is a fixed predetermined value. In other embodiments, the number threshold is dynamically adjusted according to the captured image frame, e.g. dynamically adjusted according to an average value or a ratio of the average value of a previous image frame.

In another embodiment, in order to eliminate the noise interference, the processor 37 is configured to calculate a pixel number and/or pixel positions of the digital image signals Sd corresponding to the sensing pixels in one image frame which have a nonzero brightness and larger than a brightness threshold to accordingly identify an object motion and/or a motion position. Similarly, the brightness threshold is a predetermined fixed value or dynamically adjusted according to the captured image frame.

It is appreciated that each value (e.g. a number of sensing pixels) described in the above embodiments is only intended to illustrate but not to limit the present disclosure. In addition, activating and deactivating the switching elements by the rising edge or falling edge of the control signal are not limited to those shown in FIGS. 4 and 10 and depend on the switching elements being used.

The image sensor according to the first embodiment of the present disclosure directly compares, by timing control, a first charge associated with a light source and ambient light with a second charge associated only with the ambient light, but not performs a differential operation between digital image frames respectively formed from the first charge and the second charge. Accordingly, noise due to the ambient light is eliminated.

As mentioned above, the conventional image sensor uses two digital image frames (one corresponding to a light source and ambient light and the other corresponding to the ambient light only) to perform a differential operation to eliminate noise due to the ambient light and thus its power consumption is high. Therefore, the present disclosure provides an image sensor (FIGS. 2 and 5), an operating method thereof (FIGS. 3 and 9) and a motion sensor including the image sensor that directly compares, by timing control, a first charge with a second charge in the analog front end so as to reduce noise due to the ambient light or perform the motion detection.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An image sensor comprising:
   an optoelectronic conversion circuit configured to store a first charge corresponding to a period of a high level signal and store a second charge corresponding to a period of a low level signal; and
   an output circuit comprising a first storage circuit and a second storage circuit respectively configured to store the first charge and the second charge transferred from the optoelectronic conversion circuit in a storage capacitor, and the output circuit being configured to compare the first charge in the storage capacitor of the first storage circuit with the second charge in the storage capacitor of the second storage circuit to output an analog image signal, wherein
   the first storage circuit comprises a comparator configured to compare a voltage of the storage capacitor thereof with a reference voltage to determine whether an auto exposure is performed,
   the high level signal and the low level signal are respectively configured to turn on and turn off a light source, and
   the optoelectronic conversion circuit is configured to, corresponding to the period of the low level signal, transfer the first charge to the storage capacitor of the first storage circuit, store the second charge and transfer the second charge to the storage capacitor of the second storage circuit, successively.

2. The image sensor as claimed in claim 1, wherein
   the output circuit further comprises a differential unit;
   the output circuit is configured to perform an analog differencing between the first charge and the second charge through the differential unit to compare the first charge in the storage capacitor of the first storage circuit with the second charge in the storage capacitor of the second storage circuit; and
   the first storage circuit and the second storage circuit are respectively coupled to two input terminals of the differential unit.

3. The image sensor as claimed in claim 2, wherein the first storage circuit and the second storage circuit respectively comprise a switching element and the storage capacitor, and the switching element is configured to control the first charge and the second charge in the optoelectronic conversion circuit to be transferred to the storage capacitor for storage.

4. The image sensor as claimed in claim 1, wherein an output terminal of the output circuit is coupled to an analog to digital converter for converting the analog image signal to a digital image signal.

5. The image sensor as claimed in claim 1, wherein the optoelectronic conversion circuit comprises:
   an optoelectronic element configured to convert incident light into a photocurrent;
   a pixel capacitor configured to store the photocurrent as the first charge or the second charge; and
   a transfer circuit coupled between the pixel capacitor and the output circuit, and configured to transfer the first charge from the pixel capacitor to the storage capacitor of the first storage circuit or transfer the second charge from the pixel capacitor to the storage capacitor of the second storage circuit.

6. The image sensor as claimed in claim 5, further comprising:
a drive circuit configured to generate the high level signal and the low level signal.

7. An operating method of an image sensor, the image sensor comprising an optoelectronic element, a pixel buffer circuit, a first storage circuit, a second storage circuit and a differential unit, the first storage circuit and the second storage circuit respectively coupled to two input terminals of the differential unit and comprising a storage capacitor, the optoelectronic element configured to generate photocurrents corresponding to a high level signal and a low level signal to be stored in the pixel buffer circuit, wherein the high level signal and the low level signal are configured to turn on and turn off a light source, the operating method comprising:
storing a first charge from the optoelectronic element to the pixel buffer circuit in a period of the high level signal;
transferring the first charge in the pixel buffer circuit to the storage capacitor of the first storage circuit in a period of the low level signal;
storing a second charge from the optoelectronic element to the pixel buffer circuit in the period of the low level signal after the first charge is transferred;
transferring the second charge in the pixel buffer circuit to the storage capacitor of the second storage circuit;
comparing a voltage of the storage capacitor of the first storage circuit with a reference voltage to determine whether an auto exposure is performed; and
comparing, by the differential unit, charges stored in the storage capacitor of the first storage circuit and in the storage capacitor of the second storage circuit to output an analog image signal.

8. The operating method as claimed in claim 7, further comprising:
transferring the first charge from the pixel buffer circuit to the storage capacitor of the first storage circuit or transferring the second charge from the pixel buffer circuit to the storage capacitor of the second storage circuit through a transfer circuit.

9. The operating method as claimed in claim 8, wherein the first storage circuit and the second storage circuit respectively further comprise a switching element, and the switching element is configured to control the first charge and the second charge in the pixel buffer circuit to be transferred to the storage capacitor for storage.

10. The operating method as claimed in claim 7, further comprising:
converting the analog image signal to a digital image signal,
wherein the comparing, by the differential unit, charges stored in the storage capacitor of the first storage circuit and in the storage capacitor of the second storage circuit is referred to performing an analog differencing, by the differential unit, between the charges stored in the storage capacitor of the first storage circuit and in the storage capacitor of the second storage circuit.

11. The operating method as claimed in claim 7, wherein the image sensor further comprises:
a drive circuit configured to generate the high level signal and the low level signal.

12. An image sensor comprising:
an optoelectronic conversion circuit configured to generate a photocurrent associated with a light source and ambient light in a first period and generate a photocurrent associated with the ambient light in a second period;
a first storage circuit configured to store, in the second period, a first charge corresponding to the photocurrent of the first period in a storage capacitor thereof;
a second storage circuit configured to store a second charge corresponding to the photocurrent of the second period after the first charge is stored in a storage capacitor thereof; and
a differential unit comprising two input terminals respectively coupled to the first storage circuit and the second storage circuit, and configured to compare the first charge in the storage capacitor of the first storage circuit with the second charge in the storage capacitor of the second storage circuit to eliminate noise due to the ambient light,
wherein the first storage circuit comprises a comparator configured to compare a voltage of the storage capacitor thereof with a reference voltage to determine whether an auto exposure is performed.

13. The image sensor as claimed in claim 12, wherein the first storage circuit and the second storage circuit respectively comprise a switching element and the storage capacitor, and the switching element is configured to control the first charge and the second charge in the optoelectronic conversion circuit to be transferred to the storage capacitor for storage.

14. The image sensor as claimed in claim 12, wherein the differential unit is configured to perform an analog differencing between the first charge and the second charge to compare the first charge in the storage capacitor of the first storage circuit with the second charge in the storage capacitor of the second storage circuit, and an output terminal of the differential unit is coupled to an analog to digital converter for converting an analog image signal to a digital image signal.

15. The image sensor as claimed in claim 12, wherein the optoelectronic conversion circuit further comprises:
an optoelectronic element configured to generate the photocurrents;
a pixel capacitor configured to store the first charge or the second charge before the first charge is transferred to the storage capacitor of the first storage circuit and the second charge is transferred to the storage capacitor of the second storage circuit; and
a transfer circuit coupled between the pixel capacitor and the first and second storage circuits, and configured to transfer the first charge from the pixel capacitor to the storage capacitor of the first storage circuit or transfer the second charge from the pixel capacitor to the storage capacitor of the second storage circuit.

16. The image sensor as claimed in claim 12, wherein a time interval between the first storage circuit storing the first charge and the second storage circuit storing the second charge is shorter than or equal to the first period.

17. The image sensor as claimed in claim 12, further comprising:
a drive circuit configured to generate a high level signal and a low level signal,
wherein the high level signal and the low level signal are respectively configured to turn on the light source in the first period and turn off the light source in the second period.

* * * * *